May 26, 1953 S. KRASNOW ET AL 2,640,161
ENERGIZING SYSTEM FOR BOREHOLE RADIOACTIVITY APPARATUS
Filed May 19, 1948 3 Sheets-Sheet 1

INVENTORS.
SHELLEY KRASNOW
MEYER JOSEPH TEST
BY
THEIR ATTORNEYS.

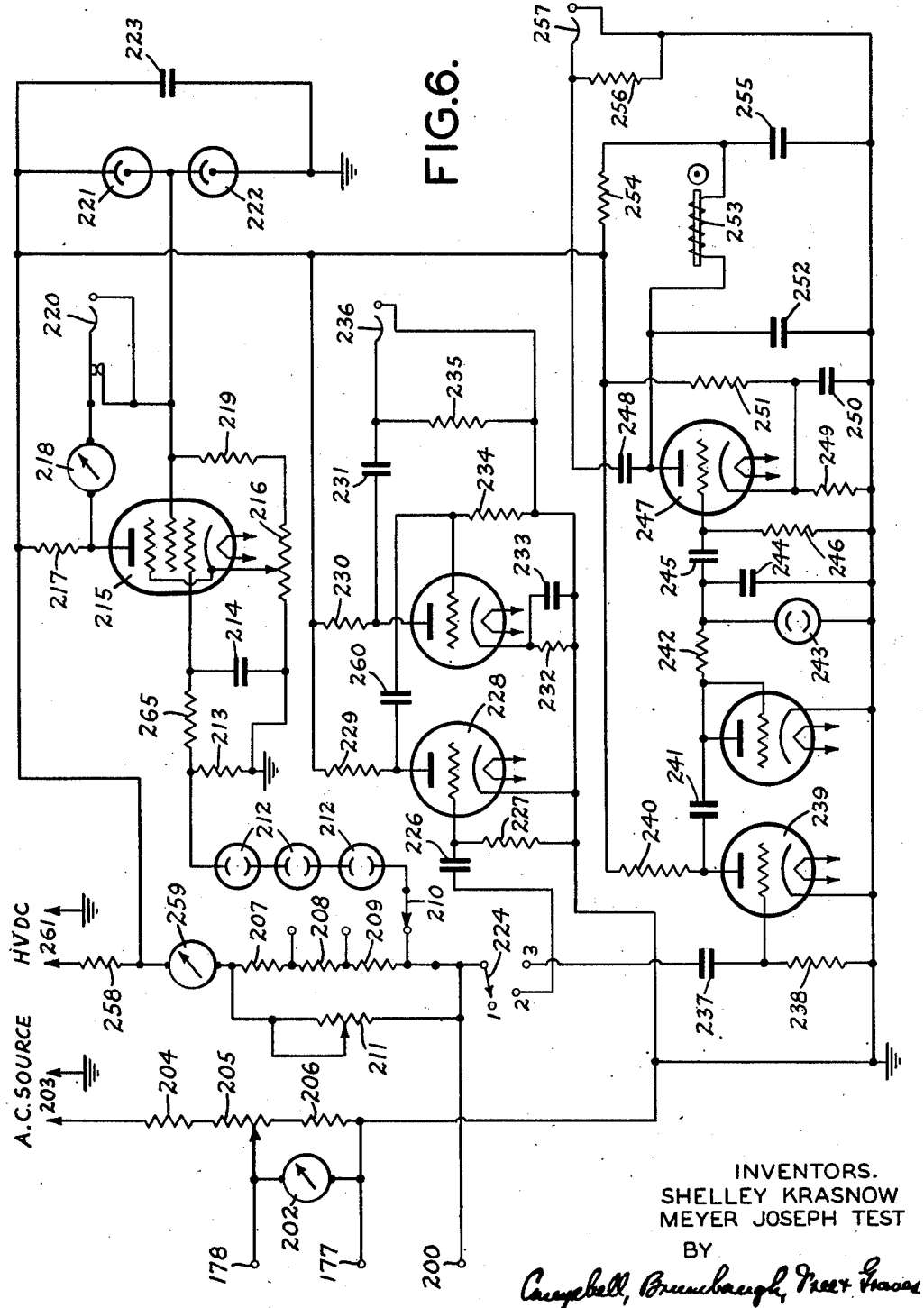

Patented May 26, 1953

2,640,161

UNITED STATES PATENT OFFICE 2,640,161

ENERGIZING SYSTEM FOR BOREHOLE RADIOACTIVITY APPARATUS

Shelley Krasnow, Fairfax County, Va., and Meyer Joseph Test, Kansas City, Mo., assignors to Schlumberger Well Surveying Corporation, Houston, Tex., a corporation of Delaware Original application October 1, 1941, Serial No. 413,240. Divided and this application May 19, 1948, Serial No. 27,857

12 Claims. (Cl. 250—83.6)

This invention relates to apparatus for measuring radioactivity in boreholes. This subject has been taught in considerable detail in the earlier work of one of the co-inventors. The present apparatus is intended to provide improved means for the expeditious and accurate measurement of radioactivity in deep boreholes, where high temperatures also exist.

It is an object of the invention to provide a convenient radioactive borehole apparatus, capable of making measurements of radioactivity at a desired depth in a borehole.

It is a further object of the invention to provide such an apparatus which will record continuously the radioactivity measured at different depths.

It is a further object of the invention to provide an apparatus which will record faithfully and will integrate pulses from a counter device operated in the borehole.

It is a further object of the invention to obtain a heightened result in the measurement of radioactivity.

It is a further object of the invention to provide a compact counter element and associated circuit which may be contained within a narrow cartridge capable of being lowered into a borehole.

It is a further object of the invention to provide radioactive borehole apparatus which may be easily assembled and disassembled, and which is protected from mechanical shocks when in use.

It is a further object of the invention to provide a radioactive borehole apparatus which does not require a primary voltage source within the cartridge.

It is a further object of the invention to provide means for using alternating current generated at the surface of the ground to provide high voltage direct current operating a radioactive measuring instrument deep in a borehole.

It is a further object of the invention to provide an improved system for amplifying and transmitting pulses produced by a radioactive measuring system utilized in a borehole.

Other objects and advantages of the invention will be apparent from the following drawings, in which:

Figure 6 shows diagrammatically the portion of the circuit to be used at the surface of the earth.

Figure 2:
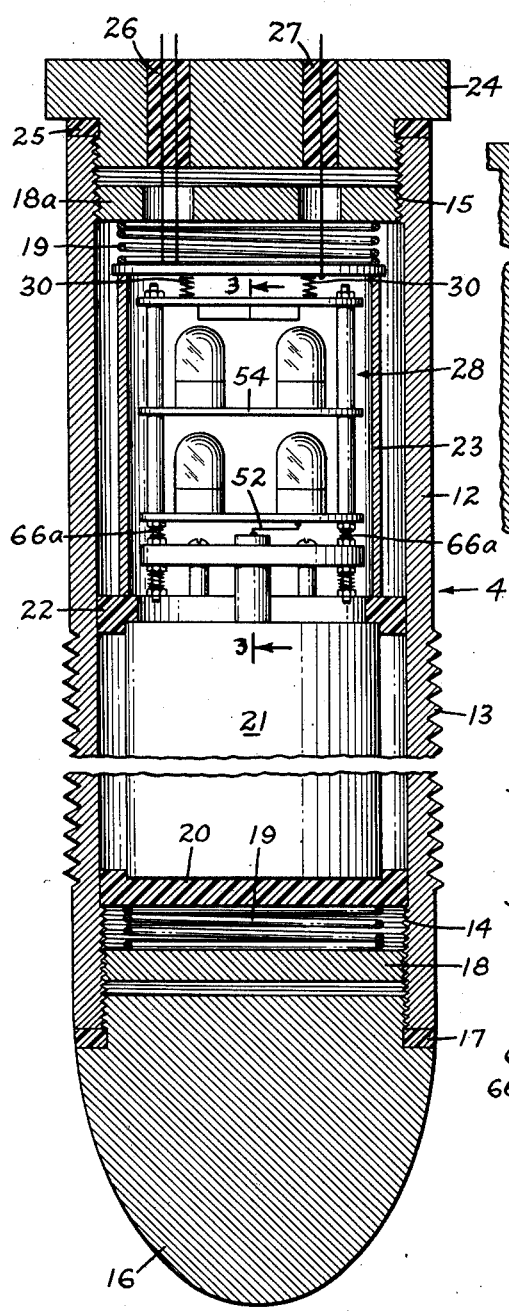
Figure 2 represents a longitudinal cross-sectional view of the cartridge shown in Figure 1, showing the relative arrangement of the elements.
Figure 1:
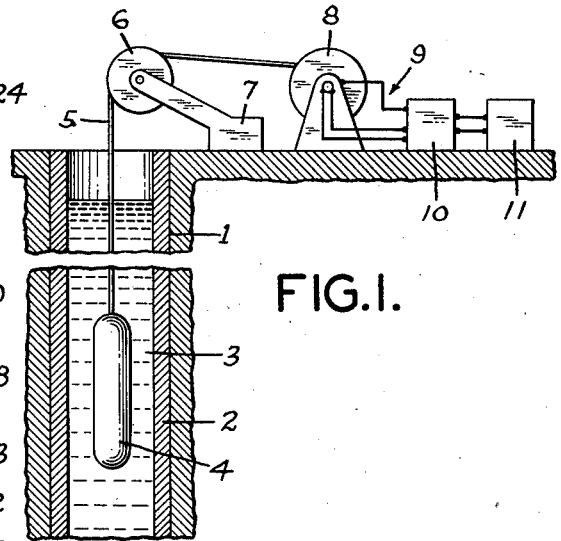
Figure 1 represents a schematic view of the apparatus as used in a borehole.

1 represents a borehole drilled in the earth in which may or may not exist a metallic casing 2. The borehole may or may not be filled with liquid 3. Suspended within the borehole is an element 4, serving to contain certain of the elements of the apparatus and to place these elements proximate to the strata from which it is desired to obtain indications. Suspending the element 4 is a multiconductor cable 5, which serves to position the element 4, to conduct energy into the said element and also to receive responses therefrom. The cable 5 passes over a measuring wheel 6, which at all times indicates the depth of the element 4, and which may be connected to other portions of the apparatus to record the depth against any other desired quantity. The wheel 6 rests upon a support 7 at the top of the borehole. Cable 5 may be reeled or unreeled by means of a drum 8, which has slip rings allowing connection to be made during rotation and for any position of the drum to a number of stationary wires 9. These wires lead to apparatus 10 and 11, whose purpose will be hereinafter described.

Referring now particularly to Figure 2, 12 represents the exterior of the cartridge 4. This is preferably made of a strong metal such as high strength steel, and may be provided with a corrugated exterior surface 13 where the rays are to pass through. At either end of the member 12 internally threaded portions 14 and 15 are provided into which suitable supports and closures may be fastened. At the lower end of the cartridge is a closure 16 which may be screwed into the tube 12 and which bears against a gasket represented schematically as 17 to shield the apparatus against high hydrostatic pressures. Above the upper portion of the element 16 is a threaded insert 18 which serves as a mechanical support. This bears against a coil spring 19, which in turn bears against an insulating block 20. Fastened rigidly to the insulating block 20 is a radioactive sensitive element 21, which may be of the type disclosed in copending application Serial No. 27,856, filed May 19, 1948, for Construction of Geiger-Müller Tube, now Patent No. 2,605,435. Insulating ring 22 is fastened rigidly to the upper end of the radioactive sensitive element, and a preferably metallic tube 23 rests upon the upper end of this insulator. An additional threaded insert 18a is placed above tube 23, and serves to compress a coil spring 19. This assemblage maintains the element 21 in a sort of floating support, held by springs above and below. The elements 20 and 22 will make light frictional contact against the walls of the tube 12, which will serve to damp mechanical oscillations. This may be aided by providing small springs which bear against the interior wall of the tube 12 and thus provide definite frictional contact. An upper closure 24 is provided which compresses a gasket 25 and serves to maintain the entire assemblage in fluid-tight and pressure-resistant condition. Wires lead through upper member 18a, through pressure-tight insulating bushings 26 and 27, respectively, and further to the surface of the earth. These wires are attached in mechanically strong fashion to element 24 so that they may be used to support the entire apparatus. Lying above insulating plate 22 is assemblage 28, containing the auxiliary elements and other portions required for operation. This is in form of a relatively rigid frame upon which are mounted the vacuum tubes, condensers and resistors necessary for operation. The frame 28 rests upon springs 29, which may be three in number and is also held downward by springs 30, which may also be three in number.

The assemblage 28 is preferably made in the form of a unitary structure which can be inserted into the cartridge 12 or removed conveniently at will.

The assemblage may be made of a number of plates such as 54, which are held in rigid spaced relation by means of rods 56, and separators 59. Nuts 58 serve to clamp the entire assemblage together. The number of rods 56 may be two, three, four, or more in number. Each of the elements 54 may be in the form of a disk of metal provided for example with vacuum tube sockets such as 60, and openings such as 61, through which wired connections may be taken from one level into another. Circuit elements such as condensers represented schematically as 57, may be fastened to a plate such as 53. The entire assemblage is wired together so that only the input and output wires extend below and above respectively. It has been found that certain elements such as condensers will have their capacity vary in proportion to the temperature. This will introduce erroneous results in some cases in the apparatus, and where such conditions exist a thermal insulating enclosure of the type shown in the copending application Serial No. 203,814, filed January 2, 1951, for Temperature Compensated Bore Hole Radioactivity Apparatus, may be utilized.

Figure 3:
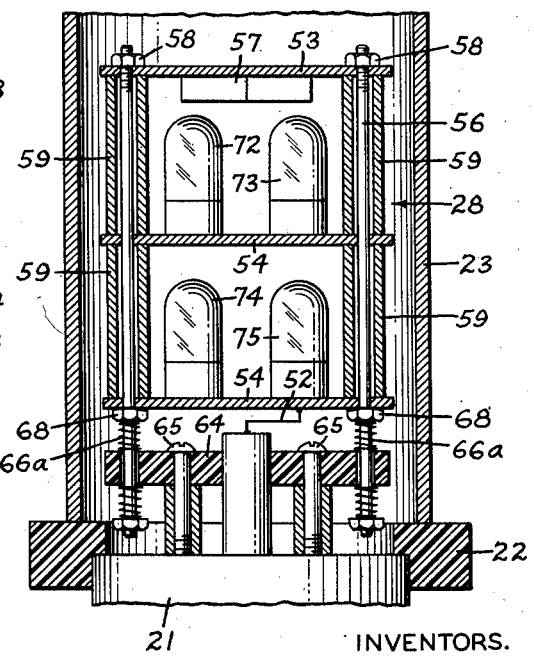
Figure 3 shows a detail indicating the manner of mounting the circuit element in the embodiment shown in Figure 2.

A detail of the spring mounting of the assemblage 28 is shown in Figure 3. Here threaded rods 56 pass through a disk 64, which is attached rigidly to the top of counter tube 21 by means of screws 65. At the lower end of the rod 56, a shoulder portion 68 is provided. Underneath this are springs 66a, which may be of coil form. Underneath disk 64 an additional set of springs is provided. Nuts are fastened at the lower portion of rod 56, thus providing a floating spring mounting for the entire assemblage 28.

Any other portion of the apparatus which is found to be temperature sensitive may be provided with suitable temperature compensating means as shown in the above copending application Serial No. 203,814, for example, and so kept at relatively constant temperature.

It will be noted that the spring mountings for the counter tube 21 and the assemblage 28 are individual. The tube structures should preferably have different periods of oscillation so as to tend to suppress oscillations. It is understood that the unitary assemblage 28, may hold the elements of any desired circuit or auxiliary apparatus to operate the radioactive sensitive element, and to receive responses therefrom.

Figure 5:
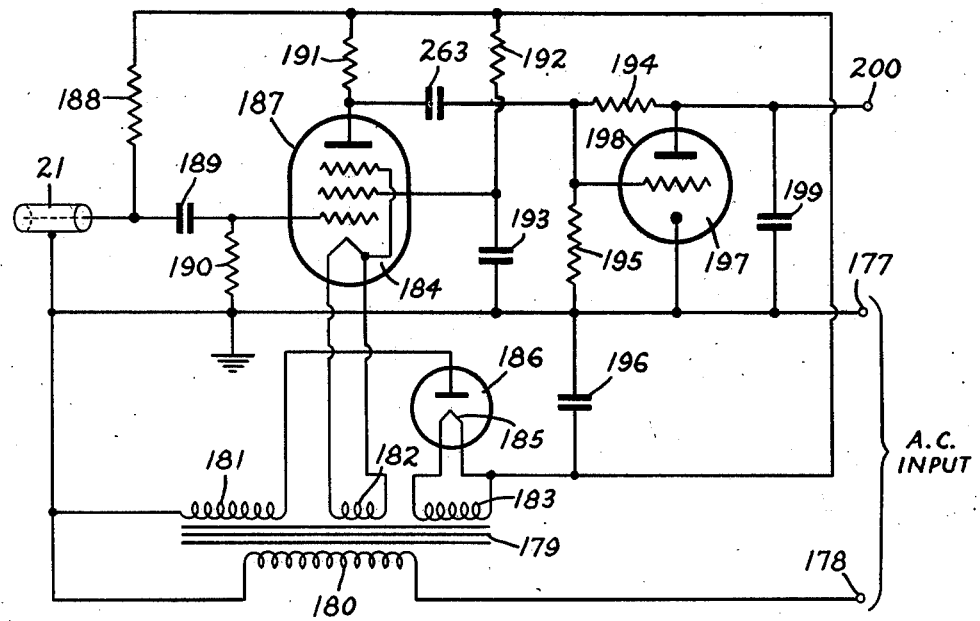
Figure 5 shows diagrammatically the portion of the circuit which is disposed in the cartridge.
Figure 4:
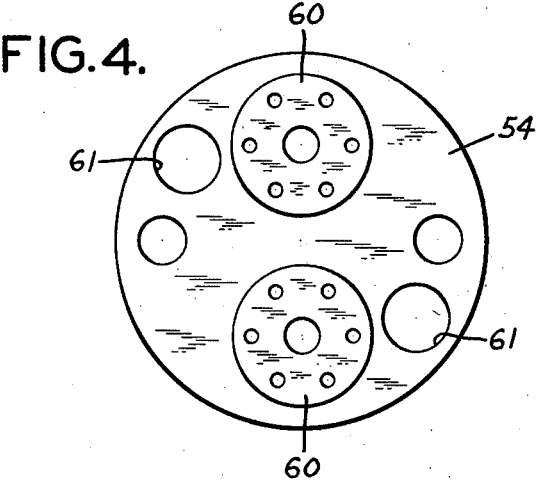
Figure 4 shows a plan view of one of the sections shown in Figures 2 and 3.

Alternating current at a frequency of 60 cycles at about 30 volts may be applied across terminals 177 and 178 of the circuit shown in Figure 5. A transformer 179 is provided having a primary winding 180, and secondary windings 181, 182, and 183. Winding 182 provides sufficient voltage and current to operate the filament 184 of tube 187. Similarly, winding 183 provides sufficient voltage and current to supply filament 185 of tube 186. Winding 181 provides current at a voltage which may be 1,000 to a rectifier tube 186. The high voltage alternating current is rectified and fed through resistor 188 and directly to the Geiger-Müller counter as shown. As will be seen, the negative terminal is grounded, this terminal being connected to the outer cylinder of the Geiger-Müller counter 21. The pulses produced by discharges of the Geiger-Müller tube pass through condenser 189, and are applied across resistor 190, between the filament and grid of tube 187. The pulses are thus amplified by tube 187, and are applied to the grid 198 of cold cathode gas discharge tube 197, are amplified thereby and applied across output terminals 177 and 200.

Figure 6 shows the apparatus to be used at the surface of the ground in conjunction with the apparatus shown in Figure 5. A source of alternating current 203 is provided to supply the various elements used above ground, and also to supply the alternating current energy to be used below ground. One side of the source is grounded as shown, the other side being grounded through resistors 204, 205, and 206. The input leads 177 and 178, going to the apparatus below ground, are connected between the movable contact of potentiometer 205 and the terminal of resistor 206. Across these two terminals is placed a meter 202, to verify that the correct alternating current voltage is being supplied below ground.

The apparatus shown in Figure 6 may be used in any one of three modes. It may be used to measure the integrated direct current output of the apparatus below ground. It may be used to supply the number of pulses directly. It may be used to give the integrated pulses. A switch 224 selects which mode of operation will be utilized. When the switch is in position 1 as shown, it is connected to the leads 177 and 200. A source of relatively high voltage direct current 261, supplies the direct current needed for the apparatus above ground. This source is connected to resistor 258, in series with a milliammeter 259, and further in series with resistors 207, 208, and 209. The set of the three resistors named is shunted by a variable resistor 211, which acts as a calibration adjustment. A movable contact 210 serves to make connection to the terminals of the resistors 207, 208, and 209, and thus serves as a sensitivity control. The movable contact is connected in series with gas discharge lamps 212, which are connected further with the grid of vacuum tube 215. A condenser 213 is placed between this grid and ground. An additional control 216 is provided to set the zero of whatever meter is used and a resistor 219 is in series with this control and the control grid of the vacuum tube 215. The plate of vacuum tube 215 is connected through resistor 217 to the plate supply, and through a milliammeter 218, to an outlet jack 220. In this jack may be placed an external meter which may be of a recording type. A constant voltage is provided for both the plate and the screen grid of the tube by means of voltage regulator gas discharge tube 221 and 222, shunted by condenser 223. The meter 259 will read the average direct current plate current produced by the output tube below ground, and the meter 218, or a meter in series therewith plugged into jack 220, will read the amplified direct current thus produced.

With switch 224 in position 2, the input from the apparatus below ground will be connected through condenser 226 to the grid of vacuum tube 228. A jack 236 is provided, this giving individual amplified pulses which are fed to a counter or a similar mechanism.

With switch 224 in position 3, the input leads from the apparatus below ground are connected through condenser 237 to the grid vacuum tube 239. This tube both amplifies and rectifies the pulses produced by the apparatus below ground, and feeds them across a resistance—discharge lamp—condenser system, causing the production of integrated pulses. With this system a single pulse will be produced for a definite given number of pulses produced by the apparatus below ground. These integrated pulses are fed into vacuum tube 247, which amplifies them and which further feeds to an electromagnetic mechanical counter of the type commonly used for counting telephone messages. The output of tube 247 is also fed through condenser 248 to a jack 257, shunted by resistor 256. The output direct current at the jack will be proportional to the number of integrated pulses received. The output of jack 257 will therefore be a direct measure of the number of pulses produced per unit interval of time in the apparatus below ground. The alternating current voltage utilized for this modification may be a 60 cycle alternating current, although currents of other frequencies may be utilized. A six-volt storage battery may be provided for the source of energy, using a conventional inverter to furnish the alternating current at 60 cycles, and a conventional vibrator high-voltage power pack to furnish the high voltage direct current.

It will be noted that the use of the gas discharge tube 197 is particularly advantageous when alternating current is utilized. The pulse output produced by such a tube is so different from the alternating current used as a source of energy, that no elaborate precautions need be taken to avoid pickup between one circuit and another.

Because of the high temperatures often met with in deep boreholes, it will be found necessary when transformers or other similar electrical elements are utilized, to have those units provided with an insulating varnish capable of withstanding the temperatures encountered. The same remark applies to the resistors and condensers, although where these elements are maintained in a constant-temperature enclosure as pointed out herein, such elaborate precautions are often unnecessary.

Various elements in the different circuits have been shown without a description being given of their exact function. The function of these elements may be told from their relative positions in the respective circuits by those versed in the art.

A representative set of values which has been found to give good results is as follows:

| | |
|---|---|
| 186—high voltage rectifier | 227—2 meg. |
| 187—1LN5 | 228—7F7 |
| 188—$10^9$ ohm | 229—500,000 ohm |
| 189—.000075 mfd. | 230—75,000 ohm |
| 190—$10^8$ ohm | 231—.002 mfd. |
| 191—20 meg. | 232—5,000 ohm |
| 192—100 meg. | 233—5 mfd. |
| 193—.00015 mfd. | 234—2 meg. |
| 194—10 meg. | 235—2 meg. |
| 195—4 meg. | 237—.00015 mfd. |
| 196—.01 mfd. | 238—2 meg. |
| 198—OA4C | 239—7F7 |
| 199—.01 mfd. | 240—500,000 ohm |
| 201—1 meg. | 241—.00025 mfd. |
| 202—50 volt A. C. meter | 242—5 meg. |
| 204—2,000 ohm | 243—¼ watt neon lamp |
| 205—1,000 ohm | 244—.01 mfd. |
| 206—500 ohm | 245—.002 mfd. |
| 207—20,000 ohm | 246—10 meg. |
| 208—100,000 ohm | 247—type 2050 (RCA) |
| 209—500,000 ohm | 248—.002 mfd. |
| 211—50,000 ohm | 249—5,000 ohm |
| 212—¼ watt neon bulb | 250—5 mfd. |
| 213—1 meg. | 251—250,000 ohm |
| 214—.1 mfd. | 252—5 mfd. |
| 215—7C7 | 254—100,000 ohm |
| 216—5,000 ohm | 255—5 mfd. |
| 217—10,000 ohm | 256—2 meg. |
| 218—5 mil. D. C. meter | 258—3,000 ohm |
| 219—5,000 ohm | 259—0–1 mil. D. C. meter |
| 221—VR–75/30 | 263—.00015 mfd. |
| 222—VR–105/30 | 264—20 meg. |
| 223—35 mfd. | 265—50 meg. |
| 226—.00015 mfd. | |

While the specific embodiment has been drawn chiefly to a Geiger-Müller system, it will be understood that most of the members can be applied to other systems such as those utilizing ionization chambers. Thus, the construction of the tube and the mode of its use may be applied to an ionization chamber apparatus. Further, the high voltage may be applied in the same way. The transmitting circuits and the association of the circuit elements may also be utilized in ionization chamber assemblages.

This is a division of application Serial #413,240, filed October 1, 1941.

The scope of the invention is indicated by the appended claims.

We claim:

1. An apparatus for the measurement of radioactivity in a deep narrow borehole, comprising a unitary assemblage adapted to be lowered within the borehole to detect the presence of radioactivity therein a plurality of leads connected to said assemblage and serving to make electrical connection thereto, means at the surface of the earth to supply alternating current and direct current both at relatively constant voltages to said leads, said assemblage including transformer means to receive alternating current at relatively low voltage transmitted from the surface of the earth, said transformer means being adapted to produce voltage for vacuum tube elements within the said system, a section of said transformer being adapted to provide an increased high alternating current voltage, a vacuum tube rectifier to rectify the said increased voltage and a filter to filter the rectified high voltage produced, a Geiger-Müller counter tube actuated by the said high voltage and adapted to produce electrical pulses as a function of radioactivity in the vicinity thereof, and a multistage vacuum tube amplifier to amplify the said pulses and to apply them to leads proceeding to the surface of the earth, the output stage having a direct current plate voltage therefor supplied thereto by one of said leads, said one lead serving a dual purpose of conducting direct-current energy from the surface of the earth to the said output stage and of transmitting the signal from the said assemblage to the surface of the earth.

2. In an apparatus for taking measurements of radioactivity within a deep narrow borehole, in which a holder having apparatus elements mounted thereon is lowered to a desired depth within the earth, the said elements each requiring different voltages of operation, a source at the surface of the earth to provide alternating current electrical energy of a single voltage and a direct current at a relatively fixed voltage for transmission to the said holder, a cable having plural conductors connected to the said source at the surface of the earth and extending to the said holder, means within the holder for receiving one of said types of electrical energy and producing therefrom a diversity of voltages, each suitable for the respective elements requiring said voltages, means to utilize one of the said voltages to produce a signal having different frequency characteristics from that of the original electrical energy supply current at the surface of the earth, means utilizing said direct current to transmit the said signal to the said cable, and means at the surface of the earth to receive the said signal from the said cable and to record it.

3. An apparatus as in claim 2, in which part of the energy supplied is an alternating current at relatively low frequency.

4. In an apparatus for taking measurements of radioactivity within a deep narrow borehole, in which a holder having apparatus elements mounted thereon is lowered to a desired depth within the earth, the said elements each requiring a different type of electrical energy for operation, a source at the surface of the earth to provide alternating current electrical energy of a single type for transmission to the said holder, a cable having plural conductors connected to the said source at the surface of the earth, and extending to the said holder, means within the holder for receiving the said electrical energy and producing therefrom a diversity of types of electrical energy suitable for the respective elements requiring the said types of electrical energy, means to utilize one of the said produced types of electrical energy to create a signal having different electrical characteristics from that of the original electrical energy supply current at the surface of the earth, whereby discrimination between the said signal and the original electrical energy supplied will be facilitated, means to amplify the said signal, said amplifying means operating independently of the energy derived from said alternating current and serving to apply said signal to the said cable, means at the surface of the earth to receive the said signal from the said cable, and to record it in correlation with the depth at which the measurement is made, and a source of direct current electrical energy at the surface for supplying direct current through said cable to said amplifying means to energize the same.

5. An apparatus as in claim 4, in which the alternating current energy supplied is at relatively low frequency.

6. In an apparatus for measuring radioactivity in a borehole, an assemblage requiring a diversity of electrical energy types lowered into said borehole, a conducting cable and energizing and indicating elements at the surface of the earth, said energizing element including a plurality of electrical energy sources supplying alternating and direct currents, respectively, to said assemblage through the intermediacy of said cable, means associated with said assemblage to modify one of said currents to produce a plurality of types therefrom and to utilize said types to create in the presence of radioactive rays, a series of pulses indicative thereof, and means energized by said direct current to amplify said pulses for transmission through said cable to said recording element.

7. An apparatus as in claim 2, in which the signals are pulses originating from a Geiger-Müller tube mounted upon the element lowered into the borehole.

8. In a Geiger-Müller apparatus for measuring radioactivity within boreholes, an assemblage lowerable within the borehole containing a Geiger-Müller tube and an amplifier for the output thereof, said amplifier employing direct current at a lower voltage than the Geiger-Müller tube, transformer and rectifier means employing as original energy alternating current for supplying the high direct current voltage for operation of the Geiger-Müller tube, a cable with plural leads connecting said assemblages to an energy supply and signal receiver at the surface of the earth, said energy supply furnishing alternating current at relatively constant voltage to said transformer and rectifier means, further separately supplying direct current for operation of said amplifier, the same conductors in the cable being utilized for direct current supply and for signal transmission to the surface of the earth.

9. Apparatus for obtaining indications of radioactivity in a bore hole, comprising a cartridge adapted to be lowered into a bore hole, radioactivity sensitive means in the cartridge and adapted to provide an electrical pulse output as a function of radioactivity in the bore hole, amplifier means in the cartridge for amplifying the pulse output of said sensitive means, power supply means in the cartridge adapted to be energized by alternating current and connected to supply high direct current voltage for the operation of said sensitive means, a source of alternating current at the surface, electrical transmission means for supplying alternating current from said source to said power supply means in the cartridge, a source of direct current at the surface, means at the surface for providing indications of the pulses received from said amplifier means in the cartridge, and second electrical transmission means for supplying direct current from said source at the surface to said amplifier means in the cartridge to energize the same, and for transmitting pulses from the output of said amplifier means in the cartridge to said indicating means at the surface.

10. Apparatus for obtaining indications of radioactivity in a bore hole, comprising a cartridge adapted to be lowered into a bore hole, radioactivity sensitive means in the cartridge and adapted to provide an electrical pulse output as a function of radioactivity in the bore hole, amplifier means in the cartridge for amplifying the pulse output of said sensitive means, power supply means in the cartridge adapted to be energized by alternating current and connected to supply high direct current voltage for the operation of said sensitive means, a source of alternating current at the surface, electrical transmission means for supplying alternating current from said source to said power supply means in the cartridge, a source of direct current at the surface, means at the surface for providing indications of the average of the pulses received from said amplifier means in the cartridge, and second electrical transmission means for supplying direct current from said source at the surface to said amplifier means in the cartridge to energize the same, and for transmitting pulses from the output of said amplifier means in the cartridge to said indicating means at the surface.

11. Apparatus for obtaining indications of radioactivity in a bore hole, comprising a cartridge adapted to be lowered into a bore hole, radioactivity sensitive means in the cartridge and adapted to provide an electrical pulse output as a function of radioactivity in the bore hole, amplifier means in the cartridge for amplifying the pulse output of said sensitive means, power supply means in the cartridge adapted to be energized by alternating current and connected to supply high direct current voltage for the operation of said sensitive means, a source of alternating current at the surface, electrical transmission means for supplying alternating current from said source to said power supply means in the cartridge, a source of direct current at the surface, means at the surface for providing a single pulse each time a predetermined number of pulses is received from said sensitive means in the cartridge, means at the surface for providing indications of single pulses received from said single pulse providing means, and second electrical transmission means for supplying direct current from said source at the surface to said amplifier means in the cartridge to energize the same, and for transmitting pulses from the output of said amplifier means in the cartridge to said single pulse providing means at the surface.

12. Apparatus for obtaining indications of radioactivity in a bore hole, comprising a cartridge adapted to be lowered into a bore hole, radioactivity sensitive means in the cartridge and adapted to provide an electrical pulse output as a function of radioactivity in the bore hole, amplifier means in the cartridge for amplifying the pulse output of said sensitive means, power supply means in the cartridge adapted to be energized by alternating current and connected to supply high direct current voltage for the operation of said sensitive means, a source of alternating current at the surface, electrical transmission means for supplying alternating current from said source to said power supply means in the cartridge, a source of direct current at the surface, first circuit means at the surface for providing indications of the average of the pulses received from said amplifier means in the cartridge, second circuit means for providing a single electrical pulse each time a predetermined number of pulses is received from said amplifier means in the cartridge, means for providing indications of the single pulses received from said circuit means and of the average of said single pulses, third circuit means for providing indications of the pulses received from the output of said amplifier means in the cartridge, second electrical transmission means for supplying direct current from said source at the surface to said amplifier means in the cartridge to energize the same, and for transmitting pulses from the output of said amplifier means in the cartridge to the surface, and switching means for connecting said first, second and third circuit means selectively to said second electrical transmission means to receive pulses transmitted therethrough from said amplifier means in the cartridge.

SHELLEY KRASNOW.
MEYER JOSEPH TEST.

References Cited in the file of this patent

UNITED STATES PATENTS

| Number | Name | Date |
|---|---|---|
| 2,133,776 | Bender | Oct. 18, 1938 |
| 2,197,453 | Hassler | Apr. 16, 1940 |
| 2,321,295 | Howell | June 8, 1943 |
| 2,368,532 | Fearon | Jan. 30, 1945 |
| 2,369,550 | Frosch | Feb. 13, 1945 |
| 2,391,093 | Howell | Dec. 18, 1945 |
| 2,458,596 | Herzog | Jan. 11, 1949 |

OTHER REFERENCES

Gingrich: Review of Scientific Instruments, vol. 7, May 1936, pp. 207–210.

Evans et al. Review of Scientific Instruments, vol 10, November 1939, pp. 332–336.